(12) United States Patent
Uzel et al.

(10) Patent No.: US 12,699,476 B2
(45) Date of Patent: Aug. 4, 2026

(54) REMOTE SURFACE TOUCH DETECTION FOR ELECTRONIC DEVICES

(71) Applicant: Apple Inc., Cupertino, CA (US)

(72) Inventors: Baptiste C. Uzel, San Diego, CA (US); Kevin Durfee, San Francisco, CA (US); Robert D. Watson, Menlo Park, CA (US); Timothy S. Paek, Mercer Island, WA (US); Wasifa Jamal, San Diego, CA (US); Soham Banerjee, San Jose, CA (US); Vaishnavi Dhulkhed, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/009,858

(22) Filed: Jan. 3, 2025

(65) Prior Publication Data

US 2025/0278149 A1     Sep. 4, 2025

Related U.S. Application Data

(60) Provisional application No. 63/561,151, filed on Mar. 4, 2024.

(51) Int. Cl.
| | |
|---|---|
| *G06F 3/041* | (2006.01) |
| *G06F 1/24* | (2006.01) |
| *G06F 1/26* | (2006.01) |
| *H04R 1/02* | (2006.01) |

(52) U.S. Cl.
CPC ............ *G06F 3/04162* (2019.05); *G06F 1/24* (2013.01); *G06F 1/266* (2013.01); *H04R*

*1/028* (2013.01); *H04R 2420/07* (2013.01); *H04R 2499/11* (2013.01)

(58) Field of Classification Search
CPC ...... G06F 1/1656; G06F 1/1677; G06F 1/266; G06F 3/04162; G06F 1/24; G06F 2200/1636; H04R 1/1025; H04R 1/028; H04R 1/1041; H04R 2499/11; H04R 2420/07
See application file for complete search history.

(56) References Cited

U.S. PATENT DOCUMENTS

| | | | | | |
|---|---|---|---|---|---|
| 8,583,174 | B2 * | 11/2013 | Wu | ........................ | G06F 1/1694 |
| | | | | | 455/575.8 |
| 9,256,291 | B2 * | 2/2016 | Won | ...................... | G06F 3/0412 |
| 9,489,018 | B2 * | 11/2016 | Gettemy | .............. | G06F 1/1677 |
| 9,582,101 | B2 * | 2/2017 | Chang | ................... | G06F 1/1677 |
| 9,645,721 | B2 * | 5/2017 | Horne | ................... | G06F 3/0482 |
| 9,769,558 | B2 * | 9/2017 | Chandramohan | ...... | H04R 5/033 |
| 9,904,316 | B2 * | 2/2018 | Ku | ........................ | G06F 1/1677 |
| 9,904,317 | B2 * | 2/2018 | Shin | ....................... | G06F 3/041 |
| 9,977,528 | B2 * | 5/2018 | Kim | ....................... | G06F 1/169 |
| 9,986,166 | B2 * | 5/2018 | Kim | ........................ | H04N 23/62 |
| 10,013,060 | B2 * | 7/2018 | Levesque | .............. | G06F 3/0346 |
| 10,019,032 | B2 * | 7/2018 | Shin | ................. | H04M 1/72469 |
| 10,437,292 | B2 * | 10/2019 | Chu | ....................... | G06F 1/1671 |
| 10,466,793 | B2 * | 11/2019 | Levesque | ............. | G06F 1/1681 |

(Continued)

*Primary Examiner* — Vinh T Lam
(74) *Attorney, Agent, or Firm* — BAKERHOSTETLER

(57) ABSTRACT

Implementations of the subject technology provide systems and methods for detection of a user input with an electronic device, in which the input is received on or using a case for an electronic device. In one or more implementations, the case may be free of user input components such as buttons, switches, or touch sensors.

21 Claims, 10 Drawing Sheets

(56) References Cited

U.S. PATENT DOCUMENTS

| | | | | |
|---|---|---|---|---|
| 10,524,037 B2 * | 12/2019 | Watson | H04W 12/50 |
| 10,639,488 B2 | 5/2020 | Kalgren et al. | |
| 10,725,595 B2 * | 7/2020 | Schooley | G06F 1/1643 |
| 10,734,997 B2 * | 8/2020 | Bushnell | H03K 17/9618 |
| 10,757,491 B1 * | 8/2020 | Jackson | H04R 1/02 |
| 10,838,461 B2 * | 11/2020 | Kallman | G06F 1/1656 |
| 10,852,858 B2 * | 12/2020 | Paik | G06F 3/04162 |
| 11,172,101 B1 * | 11/2021 | Boozer | H04N 23/57 |
| 11,237,660 B2 * | 2/2022 | Kugler | G06F 3/045 |
| 11,252,272 B2 * | 2/2022 | Park | G06F 3/046 |
| 11,275,410 B1 * | 3/2022 | Hosokai | G06F 1/1647 |
| 11,416,136 B2 | 8/2022 | Nefulda et al. | |
| 11,445,816 B2 | 9/2022 | Averianov | |
| 11,579,710 B2 | 2/2023 | Rivolta et al. | |
| 11,614,838 B2 * | 3/2023 | Hayashi | G09G 3/20 |
| | | | 345/173 |
| 11,704,592 B2 | 7/2023 | Avery et al. | |
| 11,743,623 B2 * | 8/2023 | Jackson | G06F 3/0362 |
| | | | 381/386 |
| 11,751,652 B2 * | 9/2023 | Wright | A45C 13/005 |
| | | | 381/386 |
| 11,870,922 B2 * | 1/2024 | Lee | G06F 1/1698 |
| 11,968,318 B2 * | 4/2024 | Choi | H04N 23/632 |
| 12,147,605 B2 * | 11/2024 | Ligtenberg | G06V 40/107 |
| 12,185,051 B2 * | 12/2024 | Ruo | H04R 1/1025 |
| 12,200,424 B1 * | 1/2025 | Yang | H04R 1/1041 |
| 12,413,880 B2 * | 9/2025 | Jackson | H04R 3/007 |
| 2015/0103022 A1 * | 4/2015 | Shim | H04M 1/0283 |
| | | | 345/173 |
| 2015/0229754 A1 * | 8/2015 | Won | G06F 1/1632 |
| | | | 455/575.8 |
| 2015/0261298 A1 | 9/2015 | Li | |
| 2016/0026261 A1 | 1/2016 | Cheng et al. | |
| 2016/0109936 A1 * | 4/2016 | Lee | H04B 1/3888 |
| | | | 345/156 |
| 2017/0094396 A1 * | 3/2017 | Chandramohan | A45C 11/00 |
| 2017/0308284 A1 * | 10/2017 | Lee | G06F 3/1423 |
| 2018/0150104 A1 * | 5/2018 | Ku | G06F 1/1677 |
| 2018/0181163 A1 * | 6/2018 | Shin | H04M 1/0277 |
| 2018/0299996 A1 * | 10/2018 | Kugler | G06F 3/017 |
| 2020/0092625 A1 * | 3/2020 | Raffle | H04R 1/026 |
| 2020/0264753 A1 * | 8/2020 | Choi | G06F 3/03545 |
| 2020/0336584 A1 * | 10/2020 | Park | G06F 3/046 |
| 2021/0027199 A1 * | 1/2021 | Avery | G06F 3/017 |
| 2021/0028806 A1 * | 1/2021 | Tsoi | H04M 1/724092 |
| 2022/0103675 A1 * | 3/2022 | Hulbert | G06Q 20/204 |
| 2023/0155403 A1 * | 5/2023 | Prasad | H02J 7/00034 |
| | | | 320/107 |
| 2023/0224626 A1 * | 7/2023 | Takahashi | H04R 5/04 |
| | | | 381/309 |
| 2023/0247341 A1 * | 8/2023 | Saulsbury | A61B 5/6803 |
| | | | 381/380 |
| 2023/0259324 A1 * | 8/2023 | Sugimori | G06F 3/0488 |
| | | | 345/173 |

* cited by examiner

800

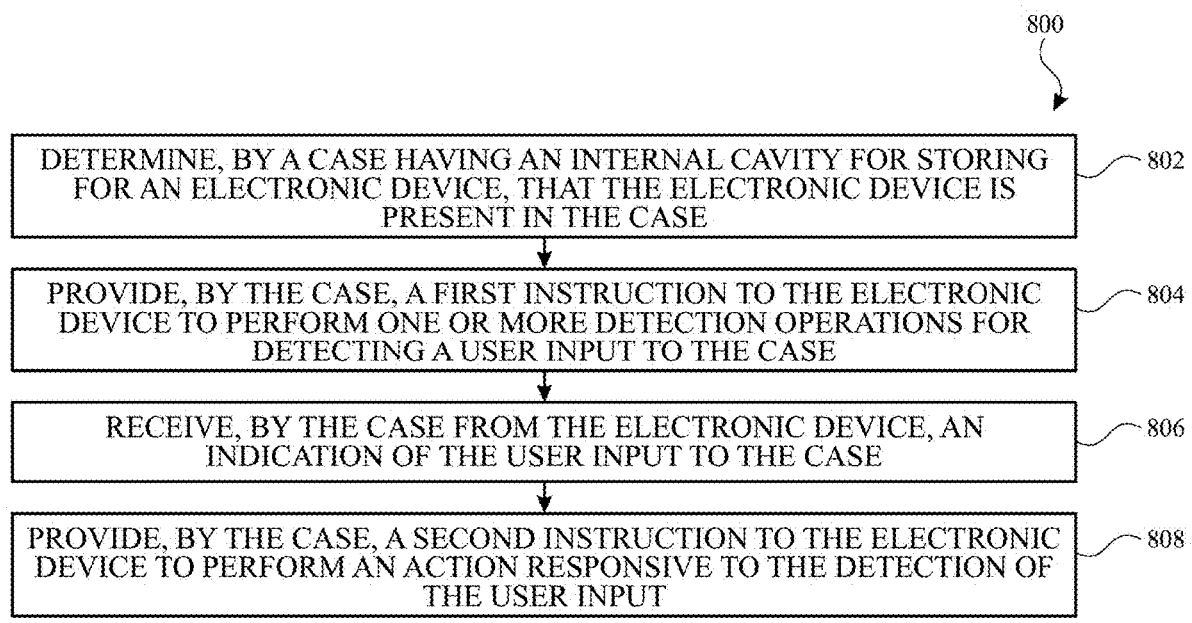

DETERMINE, BY A CASE HAVING AN INTERNAL CAVITY FOR STORING FOR AN ELECTRONIC DEVICE, THAT THE ELECTRONIC DEVICE IS PRESENT IN THE CASE — 802

PROVIDE, BY THE CASE, A FIRST INSTRUCTION TO THE ELECTRONIC DEVICE TO PERFORM ONE OR MORE DETECTION OPERATIONS FOR DETECTING A USER INPUT TO THE CASE — 804

RECEIVE, BY THE CASE FROM THE ELECTRONIC DEVICE, AN INDICATION OF THE USER INPUT TO THE CASE — 806

PROVIDE, BY THE CASE, A SECOND INSTRUCTION TO THE ELECTRONIC DEVICE TO PERFORM AN ACTION RESPONSIVE TO THE DETECTION OF THE USER INPUT — 808

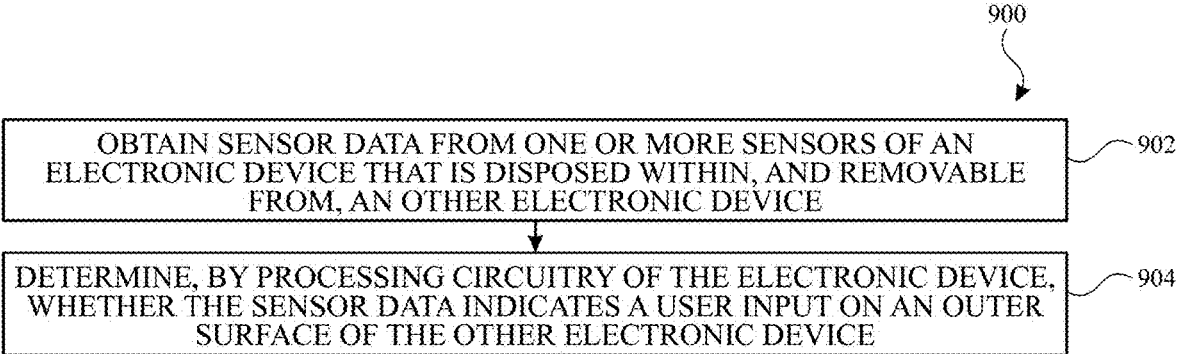

OBTAIN SENSOR DATA FROM ONE OR MORE SENSORS OF AN ELECTRONIC DEVICE THAT IS DISPOSED WITHIN, AND REMOVABLE FROM, AN OTHER ELECTRONIC DEVICE — 902

DETERMINE, BY PROCESSING CIRCUITRY OF THE ELECTRONIC DEVICE, WHETHER THE SENSOR DATA INDICATES A USER INPUT ON AN OUTER SURFACE OF THE OTHER ELECTRONIC DEVICE — 904

*FIG. 9*

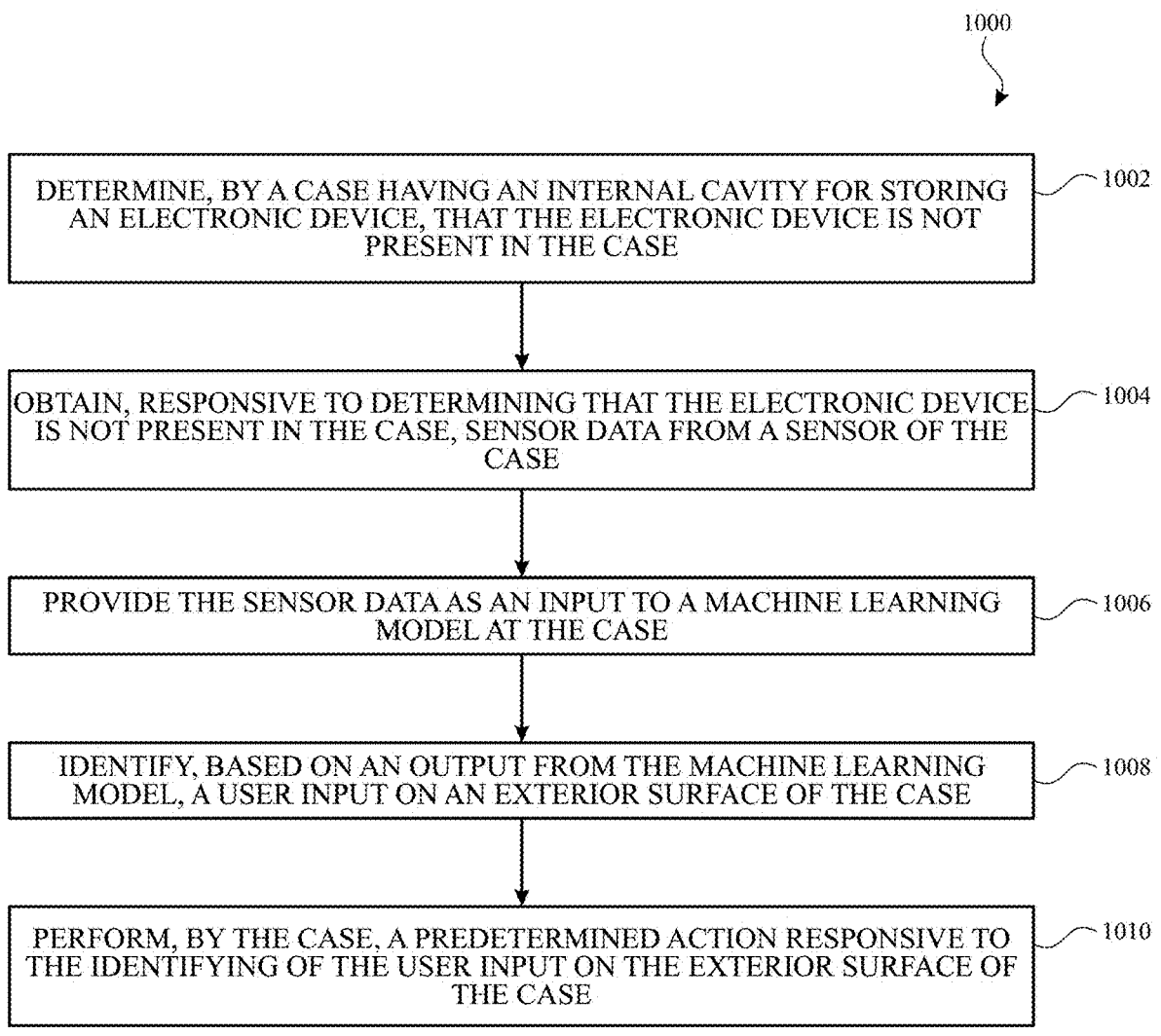

1000

DETERMINE, BY A CASE HAVING AN INTERNAL CAVITY FOR STORING AN ELECTRONIC DEVICE, THAT THE ELECTRONIC DEVICE IS NOT PRESENT IN THE CASE — 1002

OBTAIN, RESPONSIVE TO DETERMINING THAT THE ELECTRONIC DEVICE IS NOT PRESENT IN THE CASE, SENSOR DATA FROM A SENSOR OF THE CASE — 1004

PROVIDE THE SENSOR DATA AS AN INPUT TO A MACHINE LEARNING MODEL AT THE CASE — 1006

IDENTIFY, BASED ON AN OUTPUT FROM THE MACHINE LEARNING MODEL, A USER INPUT ON AN EXTERIOR SURFACE OF THE CASE — 1008

PERFORM, BY THE CASE, A PREDETERMINED ACTION RESPONSIVE TO THE IDENTIFYING OF THE USER INPUT ON THE EXTERIOR SURFACE OF THE CASE — 1010

FIG. 10

REMOTE SURFACE TOUCH DETECTION FOR ELECTRONIC DEVICES

CROSS REFERENCE TO RELATED APPLICATION(S)

The present application claims the benefit of U.S. Provisional Application No. 63/561,151, entitled "REMOTE SURFACE TOUCH DETECTION FOR ELECTRONIC DEVICES", filed Mar. 4, 2024, the entirety of which is incorporated herein for reference.

TECHNICAL FIELD

The present description relates generally to user inputs to electronic devices including, for example, to remote surface touch detection for electronic devices.

BACKGROUND

Audio devices such as headphones and earbuds can include speakers for outputting sound to a user's ears, and microphones for capturing the sound of the user's voice. In some instances, audio devices can be stored in a case.

BRIEF DESCRIPTION OF THE DRAWINGS

Certain features of the subject technology are set forth in the appended claims. However, for purpose of explanation, several embodiments of the subject technology are set forth in the following figures.

FIG. 8 illustrates a flow diagram for an example process for surface touch detection for a case for an electronic device in accordance with implementations of the subject technology.

FIG. 9 illustrates a flow diagram for an example process for remote surface detection by an electronic device in a case in accordance with implementations of the subject technology.

FIG. 10 illustrates a flow diagram for an example process for surface touch detection by a case for an electronic device in accordance with implementations of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the disclosure may provide for detection of touch inputs on an outer surface of a case for an electronic device, such as a case for earbuds. This can facilitate providing the case without external input components, such as buttons or switches, while also providing case functionality, such as for initiating pairing and/or factory reset operations for the case and/or the electronic device.

As described in further detail hereinafter, remote surface touch detection operations can be performed by a case for an electronic device when the electronic devices is in the case, by the electronic device that is within the case, and/or by the case when no electronic device is within the case. As one example, in a scenario in which the case is an earbuds case, if no earbuds are present in the case, the case may perform its own touch detection using an accelerometer and a machine learning model at the case. As another example, when one or both earbuds is present in the case, the case may instruct one or both of the earbuds to perform touch detection for the case, and then indicate to the case when a touch (e.g., any touch or a specific type of touch, such as a double tap) is detected. Aspects of the subject technology can also be applied to detect other inputs to or using a case for an electronic device, such as a shake or other movement of the case itself.

Figure 1:
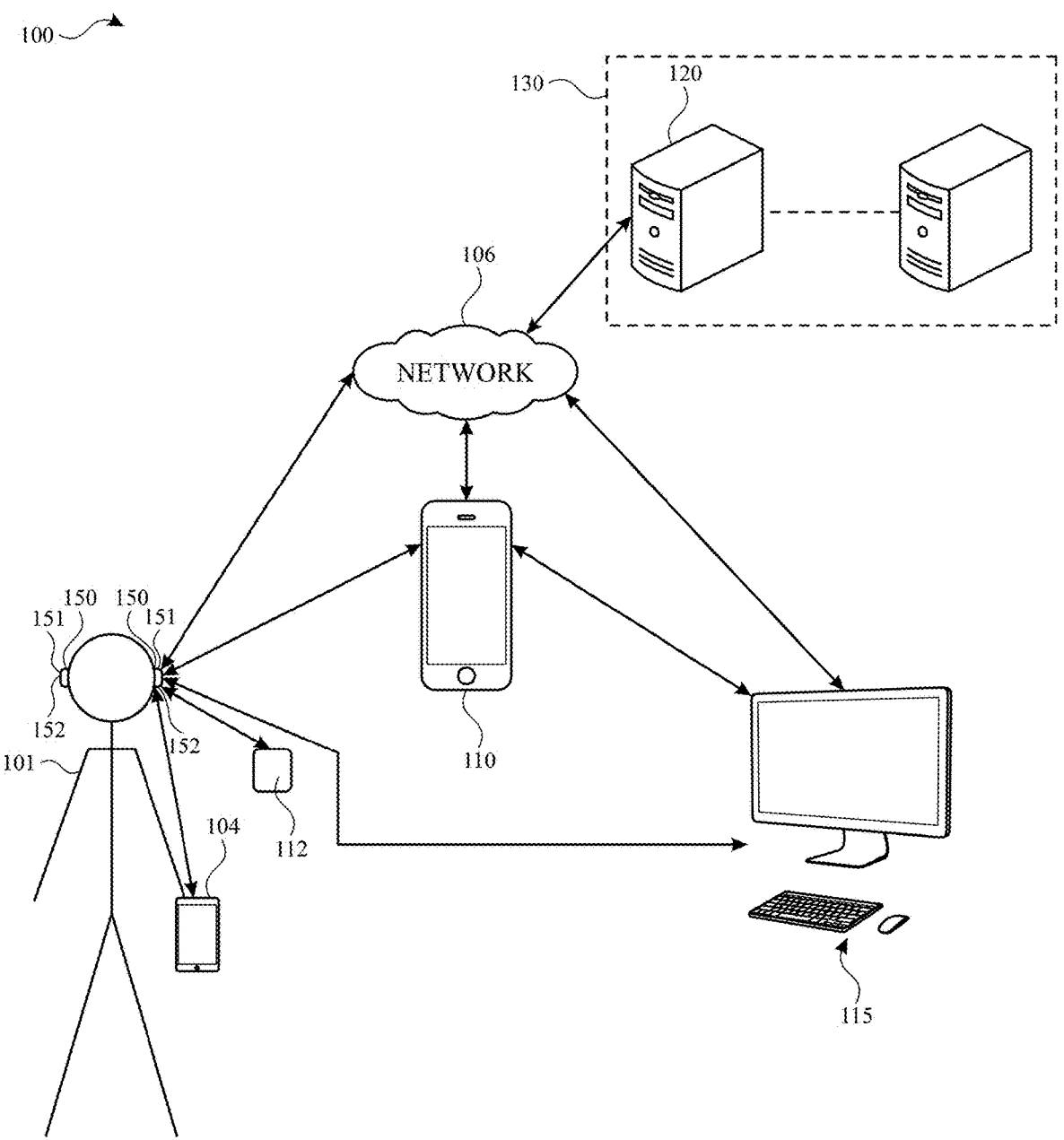
FIG. 1 illustrates an example system architecture including various electronic devices that may implement the subject system in accordance with one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes a media output device 150, an electronic device 104 (e.g., a handheld electronic device such as a smartphone or a tablet), an electronic device 110, a case 112 (e.g., a smart case), an electronic device 115, and a server 120, some or all of which communicatively coupled together by a network 106 (e.g., a local or wide area network). For explanatory purposes, the system architecture 100 is illustrated in FIG. 1 as including the media output device 150, the electronic device 104, the electronic device 110, the case 112, the electronic device 115, and the server 120; however, the system architecture 100 may include any number of electronic and/or audio devices and any number of servers or a data center including multiple servers.

The media output device 150 may be implemented as an audio device such as a smart speaker, headphones (e.g., a pair of speakers mounted in speaker housings that are coupled together by a headband), or an earbud (e.g., an earbud of a pair of earbuds each having a speaker disposed in a housing that conforms to a portion of the user's ear) configured to be worn by a user (also referred to as a wearer when the audio device is worn by the user), or may be implemented as any other device capable of outputting audio, video and/or other types of media (e.g., and configured to be worn by a user). Each media output device 150 may include one or more speakers such as speaker 151 configured to project sound into an car of the user 101, and one or more microphones such as microphone 152 configured to receive audio input such as external noise input and/or external voice inputs. The media output device 150 may include a power source, such as a battery and/or a wired or wireless power source.

In one or more implementations, the media output device 150 may include display components for displaying video or other media to a user, or may be provided without a display components. Although not visible in FIG. 1 (see, e.g., FIG. 2 or FIG. 3), each media output device 150 may include processing circuitry (e.g., including memory and/or one or more processors, such as a central processing unit and/or one or more digital signal processors (DSPs)) and communications circuitry (e.g., one or more antennas, etc.) for receiving and/or processing audio content from one or more of the electronic device 104, the electronic device 110, the electronic device 115, and/or the server 120. The processing circuitry of the media output device 150 or another device may operate one or more speakers, such as the speaker 151, to generate the sound. The memory may store one or more machine learning models implemented as neural networks and trained for one or more audio processing operations and/or one or more detection operations for detecting user inputs to the media output device 150 and/or to a remote surface, such as a surface of the case 112.

For example, case 112 may be a case for the media output device 150. For example, the case 112 may be configured to temporarily and/or occasionally store the media output device 150, such as when the media output device 150 is not in use (e.g., not being used to generate sound with one or more speakers thereof, and/or not being worn by the user 101). For example, the case 112 may provide mechanical and/or environmental protection for the media output device 150 when the media output device 150 is stored within the case 112. In one or more implementations, the case 112 may be configured to charge a battery of the media output device 150 when the media output device 150 is stored in the case 112. The case 112 may be referred to herein as an enclosure, a box, a carrier, a charging carrier, a jacket, a holder or the like.

The media output device 150 may include communications circuitry for communications (e.g., directly or via network 106) with the electronic device 104, the electronic device 110, the case 112, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The electronic device 104, the electronic device 110, the case 112, the electronic device 115, and/or the server 120 may include communications circuitry for communications (e.g., directly or via network 106) with media output device 150 and/or with the others of the electronic device 104, the electronic device 110, the case 112, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. In one or more implementations, the case 112 may have a limited set of communications circuitry as compared with the communications circuitry of the electronic device 104, the electronic device 110, the electronic device 115, or the media output device 150. For example, the case 112 may include only Bluetooth circuitry, or only Bluetooth and WiFi circuitry in some implementations.

The media output device 150 may be communicatively coupled to a companion device such as the electronic device 104, the electronic device 110 and/or the electronic device 115 in some use cases. Media output device 150 may operate in various modes. For instance, the media output device 150 can operate in various modes of operations, such as a transparent mode of operation in which at least portions of an external audio input to the media output device 150 is passed through to the car of the user using the speaker(s) 151, or a noise-cancelling mode of operation in which the media output device 150 removes or cancels all external audio input (e.g., by filtering out external audio input and/or by generating an out-of-phase noise cancelling signal to cancel out the audio input), with or without concurrently outputting audio content in either of these modes of operation. In the transparent mode operation and/or other modes of operation such as a voice enhancement mode of operation, one or more DSPs and/or neural networks of the media output device may perform source separation operations on incoming external audio input and may remove, cancel, suppress, and/or enhance various components of the separated incoming external audio input. In the noise-cancelling mode of operation, one or more DSPs and/or neural networks of the media output device may perform source separation operations on the incoming external audio input to suppress, cancel, or remove all of the incoming external audio input from the sound that enters the user's ear.

The media output device 150 may also operate in one or more other modes of operation, such as a call/conference mode in which one or more DSPs and/or neural networks separate the voice of the user of the media output device 150 from other sounds in an audio input for transmission to another device (e.g., a remote device participating in a call, an audio conference, and/or a video conference with the user 101), or a speaker enhancement or hearing aid mode of operation in which one or more DSPs and/or neural networks separate the voice of a speaker other than the user of the media output device (or another predetermined sound such as an alarm, a cry of a baby or a pet, etc.) from other sounds in the audio input and the speaker(s) 151 of the media output device 150 are used to output the voice of the speaker (or the other predetermined sound) to the car(s) of the user 101.

Media output device 150 may also include one or more sensors such as touch sensors, inertial sensors (e.g., accelerometers, gyroscopes, and/or magnetometers), environmental sensors, and/or force sensors, such as for receiving user input. For example, a user/wearer of media output device 150 may tap a touch sensor of the media output device 150 or pinch a force sensor of the media output device 150 briefly to control the audio content being played, to control volume of the playback, and/or to switch between modes of operation. In one or more implementations, the user may hold down the force sensor while the media output device is operated in the noise-cancelling mode of operation to temporarily switch to the transparent mode of operation until the force sensor is released.

The electronic device 104 may be, for example, a smartphone, a portable computing device such as a laptop computer, a peripheral device (e.g., a digital camera, headphones, another audio device, or another media output device), a tablet device, a wearable device such as a smart watch, a smart band, and the like, any other appropriate device that includes, for example, processing circuitry and/or communications circuitry for pairing with, connecting to, and/or providing audio content to media output device(s) 150. In FIG. 1, by way of example, the electronic device 104 is depicted as a mobile smartphone device with a touchscreen. In one or more implementations, the electronic device 104 and/or the media output device 150 may be, and/or may include all or part of, the electronic device discussed below with respect to the electronic system discussed below with respect to FIG. 11.

The electronic device 115 may be, for example, desktop computer, a portable computing device such as a laptop computer, a smartphone, a peripheral device (e.g., a digital camera, headphones, another audio device, or another media output device), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 11.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server.

Figure 2:
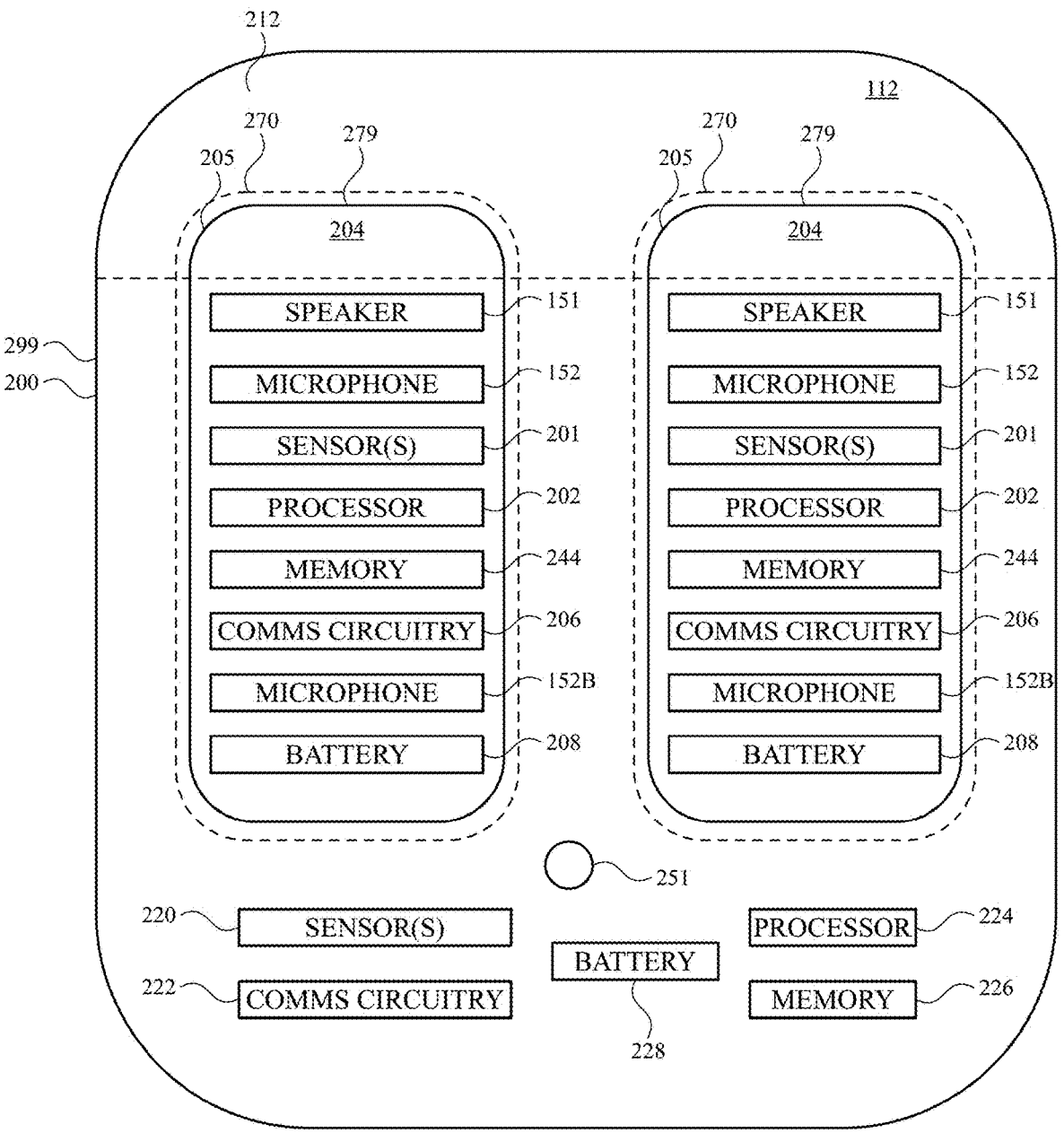
FIG. 2 illustrates a schematic diagram of a case within which other electronic devices are disposed in accordance with one or more implementations.

FIG. 2 illustrates a schematic diagram of the case 112, in a use case in which the case 112 stores two electronic devices 204. As examples, the electronic devices 204 of FIG. 2, may be implementations of the media output device 150, the electronic device 104, the electronic device 115, or any other electronic device that can be stored in a case. For example, the case 112 may include a housing 200 within which one or more cavities 270 are defined. For example, the housing 200 may be sufficiently small to be carried in the hand, a pocket, or a bag of a user (e.g., the user 101). In one or more implementations the housing 200 may include a lid 212 or cap that can be removed and/or otherwise opened (via a hinge) to provide access to the cavities 270, and can be closed to enclose the electronic devices 204 in the case 112. Cavities 270 may each be configured to receive one of the electronic devices 204. For example, the cavities 270 may each have a size and/or a shape that conforms to a size and/or shape of a housing 205 of the electronic device 204 that the cavity 270 is designed to receive. For example, an outer surface 279 of the housing 205 of each of the electronic devices 204 may contact an interior surface of the cavity 270 in the case 112 at one or more locations, when the electronic devices 204 are within the cavities 270.

As shown, the case 112 itself may be an electronic device (e.g., a smart case) that includes processing circuitry (e.g., one or more processors, such as processor 224), memory 226, communications circuitry 222, one or more sensors

220, and/or a power source such as battery 228. In one or more implementations, the case 112 may be configured to charge a battery 208 of each of the electronic devices 204 when the electronic devices 204 are disposed within the cavities 270. For example, in one or more implementations, the electronic devices 204 may have external electrical contacts that each contact a corresponding electrical contact on the interior surface of the cavity 270 when the electronic devices 204 are disposed within the cavities 270. Electrical charge, current, voltage, and/or communication signals may be provided between the electronic devices 204 and the case 112 via the electrical contacts when the electronic devices 204 are disposed within the cavities 270.

As shown, in one or more implementations, the case 112 may be free of (e.g., provided without, or exclude) any user input components, such as buttons, switches, or touch sensors (e.g., capacitive or resistive touch sensors), including on the housing 200 (e.g., on the outer surface 299 of the housing 200). For example, the sensor(s) 220 may be free of (e.g., may not include or may exclude) buttons, switches, touch sensors, or any other sensors or components on the outer surface 299 of the housing 200. The sensors 220 may include one or more inertial sensors, such as one or more accelerometers, one or more gyroscopes, and/or one or more magnetometers. For example, the sensor(s) 220 may be configured for detecting the orientation and/or motion of the case 112. However, it may be desirable to be able to receive user inputs to the case 112, even when the case 112 is provided without any user input components on the outer surface 299 of the housing 200.

In one or more implementations, the case 112 may detect a user input to the outer surface 299 of the housing 200 using the sensor(s) 201, such as by providing an accelerometer signal from an accelerometer of the sensor(s) 201 to a machine learning model running on the processor 202, the machine learning model having been trained to detect touch inputs (e.g., taps, double taps, triple taps, other taps, swipes, or other touch inputs) to the case 112 based on accelerometer data. For example, when a user taps the outer surface 299 of the housing 200 (e.g., at any location on the housing 200), the case 112 may move, and/or vibrate in a characteristic manner than can be represented in the accelerometer data and that can be learned by the machine learning model at the case 112. However, because the case 112 is primarily a storage container for the electronic devices 204 (e.g., rather than a standalone electronic device configured to generate user outputs and/or run applications for a user), the processing power of the processor 224 may be limited. Accordingly, it may be beneficial to be able to utilize one or both of the electronic devices 204 to detect touch inputs (e.g., taps, double taps, triple taps, other taps, swipes, or other touch inputs) to the case 112 (e.g., touch inputs on a remote surface that is remote from the outer surface 299 of the electronic device(s) 204 themselves).

As shown, each of the electronic devices 204 may include processing circuitry, such as one or more processors 202, memory 244, a power source such as a battery 208, and communications circuitry 206. For example, the communications circuitry 206 of each electronic device 204 may be configured for communicating with the case 112, the other of the electronic devices 204, the electronic device 104, the electronic device 110, the electronic device 115, and/or other electronic devices within a wireless communications range of the electronic device 204.

As shown, each of the electronic devices 204 may also include one or more sensor(s) 201 (e.g., touch sensors, force sensors, pressure sensors, environmental sensors, and/or inertial sensors such as accelerometers, gyroscopes, and/or magnetometers). As shown, the electronic devices 204 may each also include one or more speakers 151 (e.g., for generating sound for output for a user), and/or one or more microphones 152 for receiving audio input signals. In the example of FIG. 2, each of the electronic devices 204 includes two microphones 152 (e.g., a top microphone 152 and a bottom microphone 152B in some examples). In one or more implementations, one or more machine learning models may be stored by the memory 244. In one or more implementations, the machine learning models at each of the electronic devices 204 may have been trained to detect one or more user inputs (e.g., touch inputs) to the outer surface 299 of the housing 200 of the case 112 when the electronic device(s) 204 are within the case 112 (e.g., stored in the cavities 270 within the housing 200), even though the user inputs are not received directly at either of the electronic devices 204.

For example, in one or more implementations, one or both of the electronic devices 204 may detect a user input to the outer surface 299 of the housing 200 of the case 112 using the sensor(s) 201 and/or the microphones 152, such as by providing an accelerometer signal from an accelerometer of the sensor(s) 201 and/or one or more microphone signals from the microphones 152 to a machine learning model running on the processor 202, the machine learning model having been trained to detect user inputs (e.g., touch inputs, such as taps, double taps, triple taps, other taps, swipes, or other touch inputs, and/or other user inputs such as shakes of the case 112) on a remote surface (e.g., user inputs to the housing 200 of the case 112) based on accelerometer data and/or microphone data. For example, when a user taps the outer surface 299 of the housing 200 (e.g., at any location on the housing 200), the electronic devices 204 may move, and/or vibrate, within the case 112, in a characteristic manner than can be represented in the accelerometer data, and that can be learned by the one or more machine learning models at the electronic device(s) 204. When the user taps the outer surface 299 of the housing 200 (e.g., at any location on the housing 200), the sound of the user tap(s) and/or the movement of the electronic devices 204 within the case 112 may generate sounds that can be represented in the microphone data, and that can be learned by the one or more machine learning models at the electronic device(s) 204.

As shown in FIG. 2, the case 112 may also include one or more output components, such as output component 251, in one or more implementations. For example, the output component 251 may include a visible output component (e.g., one or more light-emitting diodes (LEDs)), and/or one or more audio output components (e.g., a speaker) configured to generate outputs that provide indications to a user of received user input (e.g., to provide visual feedback by turning on and/or flashing an LED or to provide audio feedback by providing a ding, ping, or chime from a speaker). For example, the output component 251 may include a simple speaker that has a reduced range of output (e.g., a single tone, or two or several tones), relative to the speaker(s) 151 of the electronic devices 204, which may be able to output music, podcasts, or any other audio content. In one or more implementations, the media output device(s) 150 in the case 112 may also, or alternatively, generate outputs that provide indications to a user of received user input to the case 112. For example, the speaker(s) of the media output device 150 may be used to generate an audible indicator of the received user input and/or to vibrate the media output device(s) 150 to provide an auditory and/or haptic indication of the received user input to the case 112.

In one or more implementations, the media output device(s) 150 may include haptic components for generating haptic feedback to user inputs to the case 112.

Figure 3:
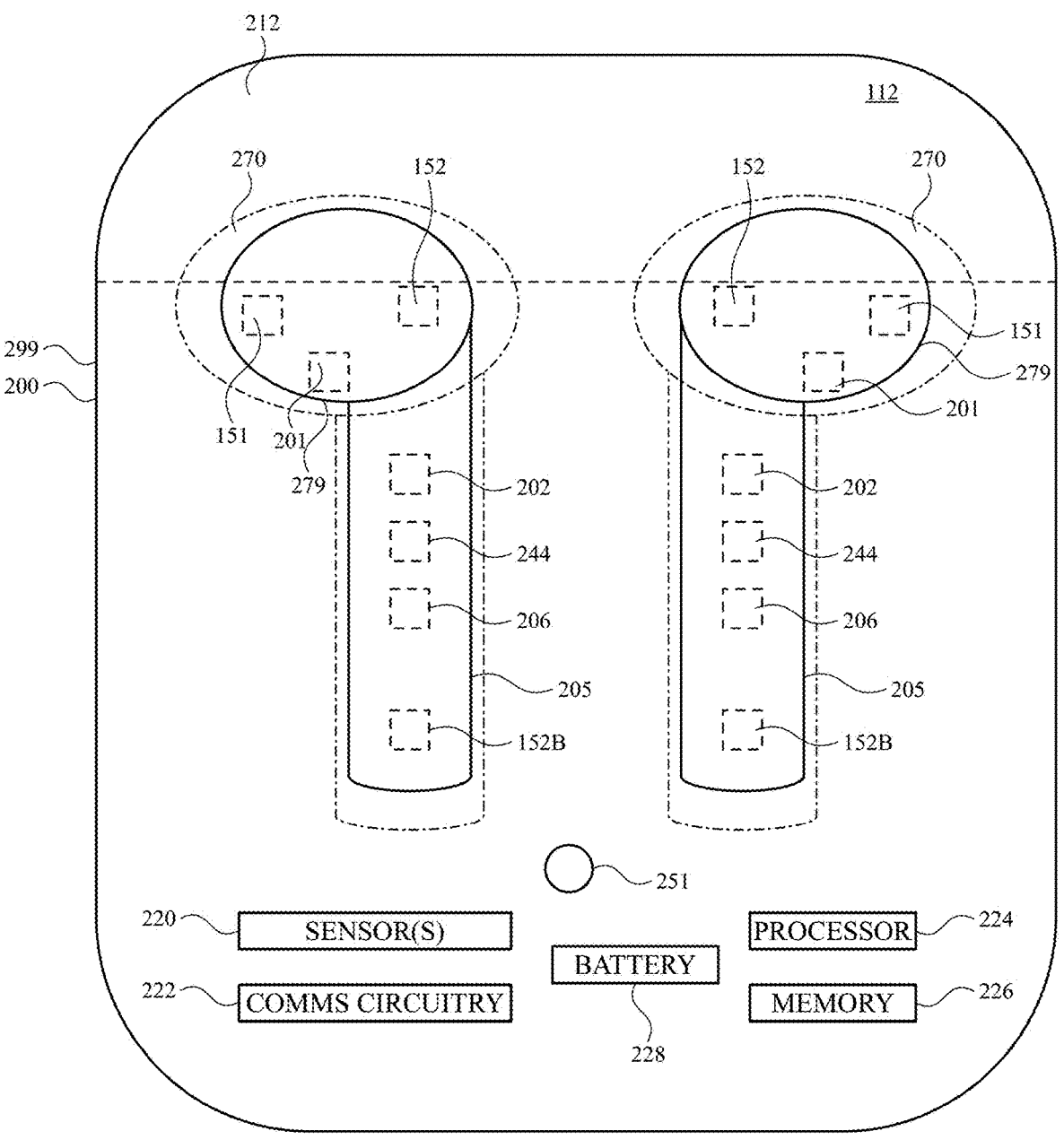
FIG. 3 illustrates a schematic cross-sectional diagram of a case within which media output devices are disposed in accordance with one or more implementations.

As discussed herein, the cavities 270 may each have a size and/or a shape that conforms to a size and/or shape of a housing 205 of the electronic device 204 that the cavity 270 is designed to receive. For example, as shown in FIG. 3, the case may be a case for a pair of earbuds (e.g., a pair of media output devices 150 implemented as earbuds), and the cavities 270 each may have a size and shape that conforms to the size and shape of an earbud. In this example, the size and the shape of the housings 205 of each of the media output devices 150 may be configured to be seated within the concha of a user's ear and to project sound directly into the ear canal of the user's ear.

FIGS. 4-7 illustrate various use cases in which user inputs to the housing 200 of the case 112 are detected. In the examples of FIGS. 4-7, the case 112 is described as a case for media output devices 150 that are implemented as earbuds, and the user inputs are described as taps or other touches on the outer surface 299 of the housing 200 of the case 112. However, it is appreciated that the case 112 may be implemented as a case for any other electronic device, and the user input may be other user inputs to the case, such as swipes across the outer surface 299 of the case 112, or shakes or other movements of the overall case 112 itself.

Figure 4:
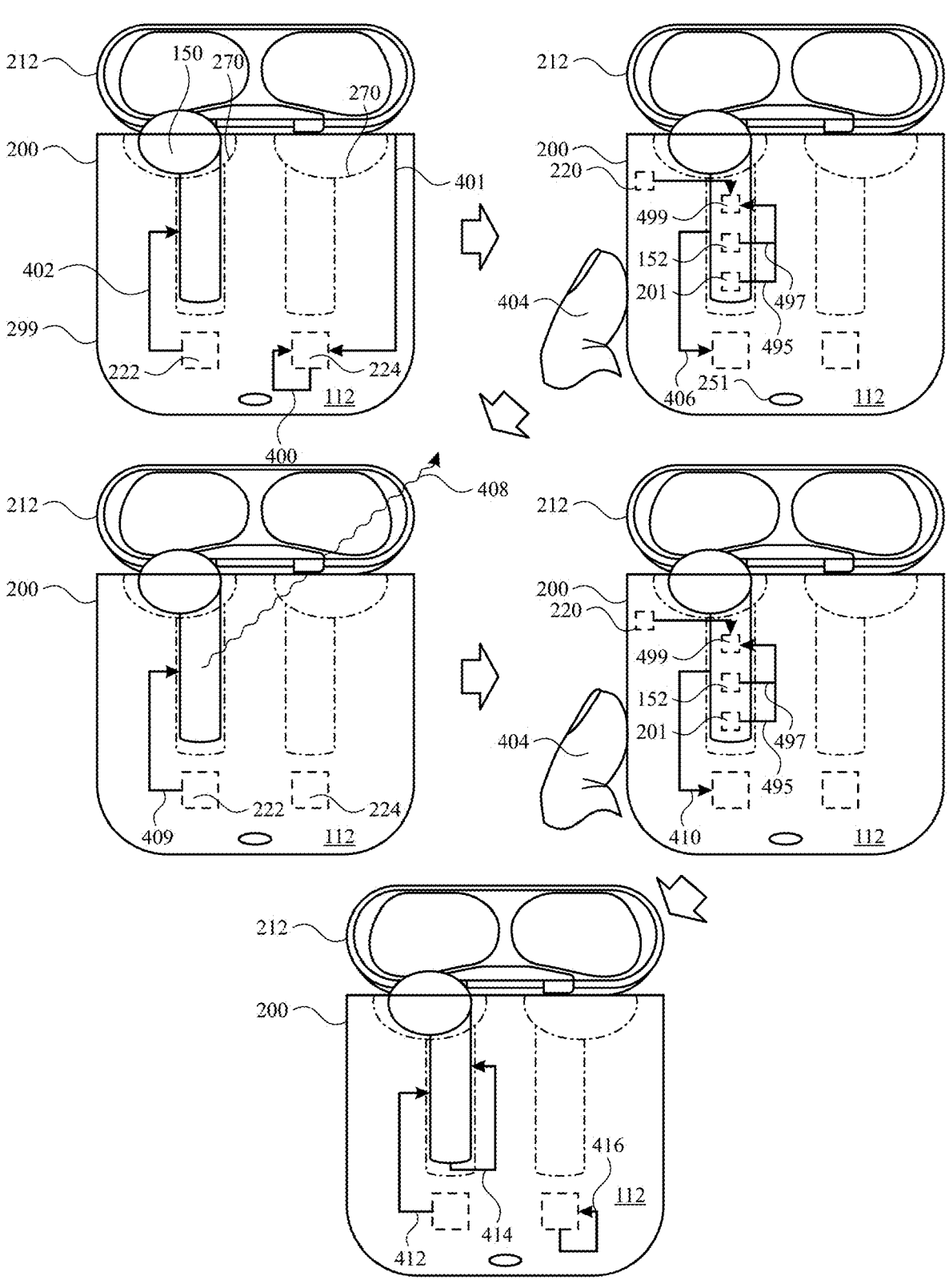
FIG. 4 illustrates a schematic diagram of an example operation for remote surface touch detection by a media output device within a case in accordance with one or more implementations of the subject technology.

For example, FIG. 4 illustrates a use case in which the case 112 is implemented as a case for media output devices 150 that are implemented as earbuds, and in which one media output device 150 is in one of the cavities 270 in the case 112 and in communication with the case 112 (e.g., via the communications circuitry 222 of the case 112). In this example, the other cavity 270 in the case 112 is empty. However, this is merely illustrative, and the operations of FIG. 4 can be performed while a second media output device 150 is in the other of the cavities 270 in some scenarios.

As illustrated in FIG. 4, the case 112 (e.g., the processor 224) may determine (400) that the media output device 150 is in the case 112 (e.g., in the cavity 270). In one or more implementations, the case 112 may determine that the media output device 150 is in the case 112 responsive to a detection 401 (e.g., by the processor 224) that the lid 212 has been opened. For example, the processor 224 may initiate an operation to determine whether one or both of the media output devices 150 are in the case 112 each time the processor 224 detects that the lid 212 has been opened. Determining that the media output device 150 is in the case 112 may include determining whether an electrical contact of the media output device 150 is in contact with a corresponding electrical contact within the cavity 270 (e.g., by determining whether the processor 224 can send and/or receive communications from the processor 202 via the electrical contacts). In one or more other implementation, the processor 224 may determine whether the media output device 150 is in the case 112 based on a wireless communication (e.g., a near field communications (NFC) communication, a Bluetooth communication, and/or a WiFi communication) with the media output device 150.

As shown, once the case 112 has determined that the media output device 150 is in the case, the case 112 may provide (e.g., using the communications circuitry 222, as controlled by the processor 224) an instruction 402 to the media output device 150 to perform one or more detection operations for detecting a user input to the case 112 (e.g., to the outer surface 299 of the housing 200 of the case 112). As shown, a user (e.g., user 101) may user their finger 404 or another instrument to provide a user input, such as one or more taps, touches, or swipes, on the outer surface 299 of the housing 200. As shown, responsive to a detection, by the media output device 150, of the user input (e.g., by the finger 404 or other instrument of a user on the outer surface 299 of the housing 200) to the case 112, the media output device 150 may provide an indication 406, to the case 112, of the detected user input.

For example, responsive to the instruction 402 (or the detection 401), the media output device 150 may activate one or more sensors 201 and/or one or more microphones 152 of the media output device 150. As shown, the sensor(s) 201 may provide sensor data 495 to a machine learning model 499 (e.g., a machine learning model being executed by the processor 202 of the media output device 150), and/or the microphone(s) 152 may provide audio data 497 to the machine learning model 499. In one or more implementations, the sensor(s) 220 of the case 112 (e.g., an accelerometer) may also provide (e.g., via the communications circuitry 222) sensor data to the machine learning model 499 at the media output device 150 for use in detecting the user input. Based on an output of the machine learning model 499, the media output device 150 may provide the indication 406 of the user input to the case 112.

As shown, responsive to receiving the indication 406, the case 112 may provide an instruction 409 to the media output device 150. For example, the instruction 409 may be an instruction to provide a battery status, or to initiate a pairing operation. In one or more implementations, the instruction 409 may be based on the user input detected (e.g., a single tap, a double tap, a triple tap, a swipe, a shake, etc.) by the machine learning model 499. In one or more implementations, the media output device 150 may initiate the pairing operation, such as by transmitting (e.g., with the communications circuitry 206) a signal 408 (e.g., a Bluetooth signal or other wireless signal) that can be detected by a nearby electronic device (e.g., electronic device 104) for pairing with the media output device 150.

In one or more implementations, the instruction 409 may be an instruction to initiate the pairing operation after a period of time (e.g., one, two, or several seconds, such as to allow time for an additional user input to the case that, combined with the first user input, changes the intention and the result of the user input). For example, as shown in FIG. 4, the media output device 150 may, after providing the indication 406 of the user input to the case 112 and receiving the instruction 409, identify (e.g., using additional sensor data 495, additional audio data 497, and/or additional sensor data from the sensor 220 provided to the machine learning model 499) another user input to the case 112, and provide, to the case 112, another indication 410 of the other user input to the case 112. As shown, responsive to the indication 410, the case 112 may provide, to the media output device 150, an instruction 412. For example, the instruction 412 may be an instruction to perform an action responsive to the detection of the other user input indicated by the indication 410 and/or the first user input indicated by the indication 406.

As illustrated in FIG. 4, responsive to the instruction 412, the media output device 150 may perform an action 414. In the example of FIG. 4, the action 414 is a self-contained action that is performed locally (e.g., by the processor 202) at the media output device 150, such as a factory reset operation. However, in other examples, the action 414 may be a communicative action that includes transmitting and/or receiving information to and/or from one or more other devices, including another of the media output devices 150 (e.g., within or outside the case 112), and/or another electronic device, such as the electronic device 104, the electronic device 110, the electronic device 115, and/or the server(s) 120. As shown, in one or more implementations, responsive to the indication 410, the case 112 (e.g., the processor 224) may also perform one or more actions 416 at the case, such as a factory reset of the case. In one or more implementations, the output component 251 may be operated (e.g., turned on, flashed, etc.), during any or all of the operations of FIG. 4, to indicate the status of the user input and/or to indicate a time-limited opportunity to provide additional user input to the case 112.

In the example of FIG. 4, the detection operations for detecting the user input(s) to the case 112 are performed by one media output device 150 in one cavity 270 within the case 112. In one or more implementations, when two media output devices 150 are present within the case 112, the case 112 may determine (e.g., based on the available sensors and/or microphones, and/or based on a charge levels of the batteries in the media output devices) which of the two media output devices 150 to instruct to perform the detection operations of FIG. 4. However, in other scenarios, both of two media output devices 150 in two cavities 270 within the case 112 may perform detection operations for detecting user input(s) to the case 112. In this way, the additional sensors, microphones, and/or processing power of the second media output device 150 can be used together with those of the first media output device 150 to enhance the sensitivity and/or accuracy of the user input detections.

Figure 5:
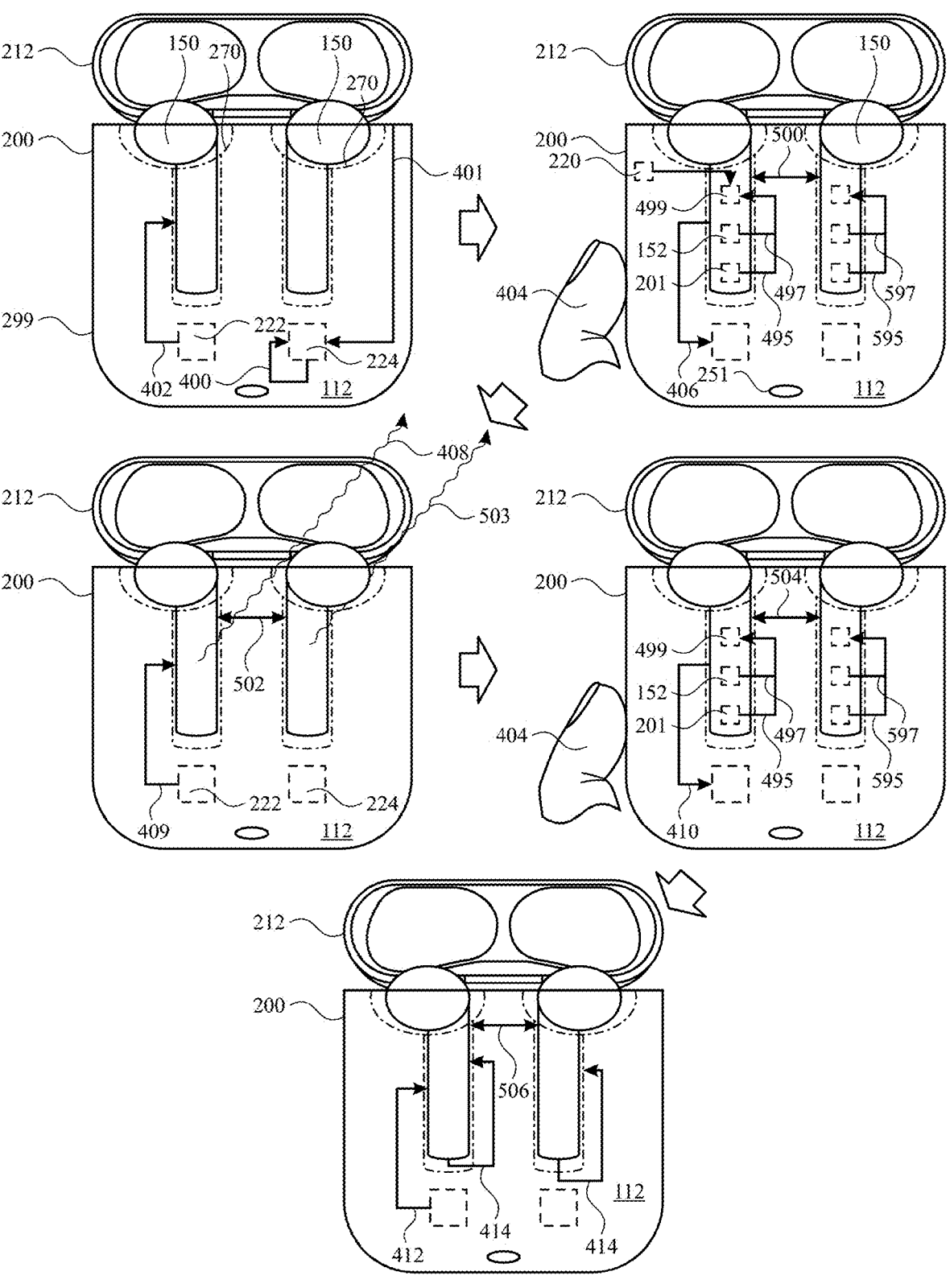
FIG. 5 illustrates a schematic diagram of an example operation for remote surface touch detection by multiple media output devices within a case in accordance with one or more implementations of the subject technology.
Figure 6:
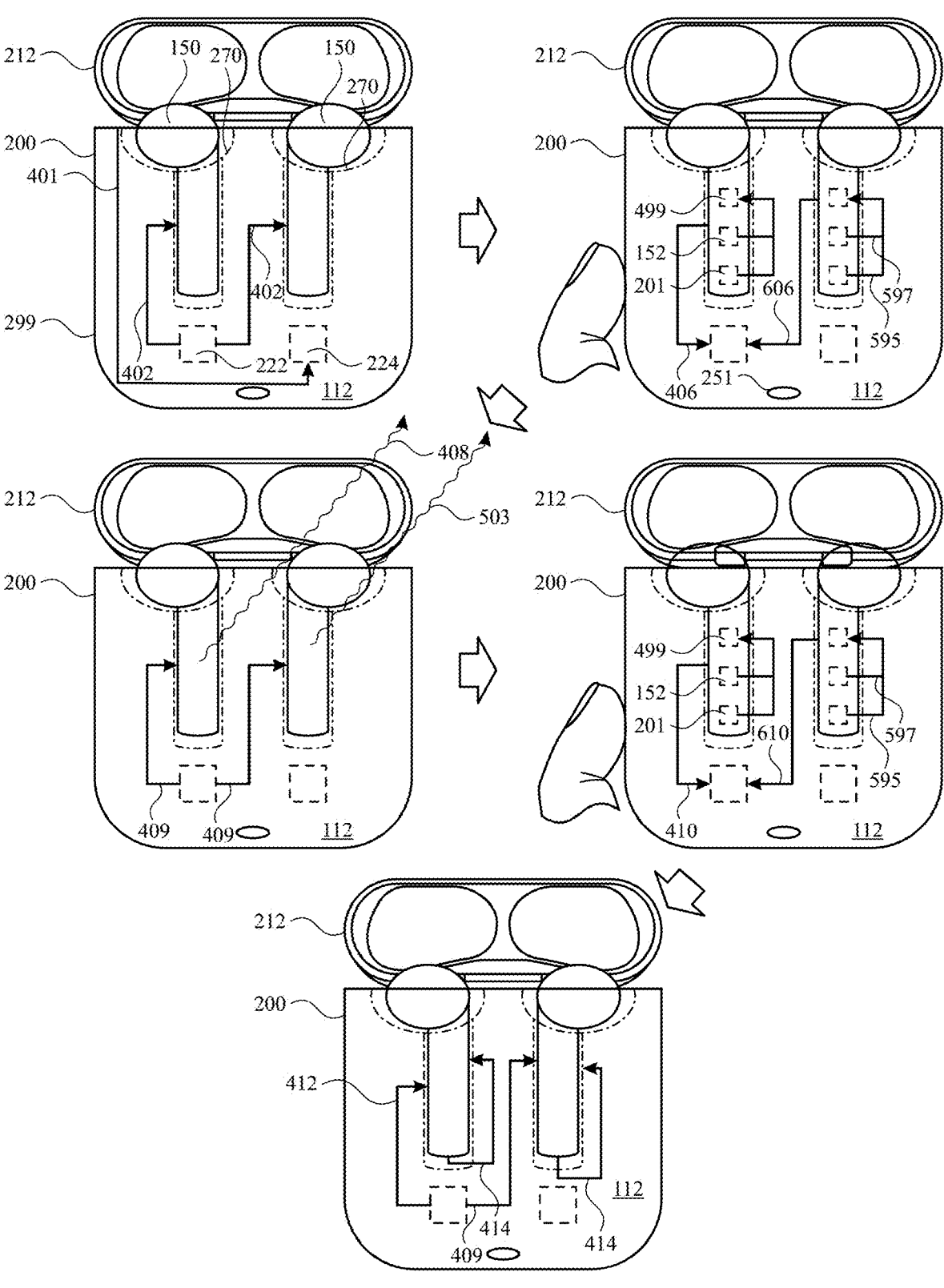
FIG. 6 illustrates a schematic diagram of another example operation for remote surface touch detection by multiple media output devices within a case in accordance with one or more implementations of the subject technology.

In various implementations, in order to utilize two media output devices for user input detection, the case 112 may instruct one of the media output devices to perform the detection operations and the one of the media output devices can control the other of the media output devices during the detection operations (e.g., as depicted in the example of FIG. 5), or the case 112 may instruct both of the media output devices to perform the detection operations in parallel (e.g., as depicted in the example of FIG. 6).

For example, as shown in FIG. 5, responsive to the instruction 402, the media output device 150 that receives the instruction 402 may exchange communications 500 with the other media output device 150 in the case 112 to perform detection operations for detecting a user input (e.g., with the finger 404 or other instrument of the user) to the housing 200 of the case 112. In one or more implementations, responsive to the communications 500, the other media output device 150 may also execute its own machine learning model 499 using sensor data 595 from its own sensors 201 and/or audio data 597 (e.g., microphone data) from its own microphones 152 (e.g., and/or sensor data from the sensor 220 of the case 112), and provide an output of its machine learning model 499 to the media output device 150 that received the instruction 402. The media output device 150 that received the instruction 402 may then combine the output received from the other media output device 150 with the output of its own machine learning model 499 to determine whether to send the indication 406 to the case. In one or more other implementations, responsive to the communications 500, the other media output device 150 may also, or alternatively, provide sensor data 595 from its sensors 201 and/or audio data 597 from its microphones 152 to the machine learning model 499 at the media output device 150 that received the instruction 402. In these other implementations, the machine learning model 499 at the media output device 150 that received the instruction 402 may receive the sensor data 595 and the audio data 597 as inputs along with the sensor data 495 and/or the audio data 497 generated at the media output device 150 that received the instruction 402, and generate a user input detection and/or classification output based thereon.

In the example of FIG. 5, the instruction 409 may be provided to the media output device that received the instruction 402. The media output device 150 that received the instruction 402 may exchange communications 502 with the other media output device 150 in the case 112 to instruct the other media output device 150 in the case 112 to perform the pairing operations (e.g., using pair information received by the media output device 150 that received the instruction 402, or by transmitting its own pairing signal 503 that can be detected by a nearby electronic device). As shown, communications 504 (e.g., including an output of a machine learning model at the other media output device 150, or sensor data and/or microphone data from the other media output device 150) may be exchanged between the media output device 150 that received the instruction 402 and the other media output device 150 in the case 112, to perform additional detection operations to detect an additional user input at the case 112 (e.g., within a predetermined period of time after the detection of the first user input to the case 112).

Detection, by the media output devices 150, or an additional user input may result in the indication 410 being provided to the case 112 to indicate the detection of the additional user input. As in FIG. 4, responsive to receiving the indication 410, the case 112 may provide the instruction 412 to the media output device 150 that received the instruction 402. In the example of FIG. 5, the media output device 150 that received the instruction 402 may exchange communications 506 with the other media output device 150 in the case 112 to instruct the other media output device 150 to also perform the action 414.

In the example of FIG. 5, the second media output device 150 in the case 112 performs detection operations under control of the first media output device 150 that communicates with the case 112. FIG. 6 illustrates another example in which the case 112 may instruct both of the media output devices 150 that are in the case 112 to perform the detection operations in parallel. For example, as shown in FIG. 6, in one or more implementations, the instruction 402 (e.g., to perform the one or more detection operations) may be provided by the case 112 to each of the (e.g., two) media output devices 150 in the case 112).

As indicated, each of the two media output devices 150 in the case 112 may operate their own machine learning model 499 (e.g., in parallel with the operation of the machine learning model 499 at the other of the media output devices 150). For example, the machine learning model 499 at a first one of the media output device 150 may receive sensor data 495 from the sensor(s) 201 and/or audio data 497 and/or microphone(s) 152 at that media output device 150, and the machine learning model 499 at a second one of the media output device 150 may receive sensor data 595 from the sensor(s) 201 and/or audio data 597 and/or microphone(s) 152 at that media output device 150. Although not depicted in FIG. 6, the machine learning model 499 at one or both of the media output devices 150 may also receive sensor data from one or more sensors 220 of the case 112.

As shown, the indication 406 of the detected user input may be provided to the case 112 from one of the media output devices 150 in the case 112, and an indication 606 of the detected user input may also be provided to the case 112 from the other of the media output devices 150 in the case 112. In this example, the case 112 (e.g., the processor 224) may use the indication 406 and the indication 606 (e.g., alone or in combination) to determine whether to provide the instruction 409 to the media output devices 150 (e.g., to initiate a pairing operation). For example, as in the example of FIG. 5, responsive to the instruction 409 from the case 112, a first one of the media output devices 150 may initiate the pairing operation, such as by transmitting (e.g., with the communications circuitry 206 of the first media output device) a signal 408 that can be detected by a nearby electronic device for pairing with the first media output device 150, and a second one of the media output devices 150 may initiate the pairing operation, such as by transmitting (e.g., with the communications circuitry 206 of the second media output device) a signal 503 that can be detected by a nearby electronic device for pairing with the second media output device 150.

As shown in FIG. 6, each of the (e.g., two) media output devices 150 in the case 112 may perform additional detection operations to detect an additional user input at the case 112 (e.g., within a predetermined period of time after the detection of the first user input to the case 112), which may result in the indication 410 being provided to the case 112 from a first one of the media output devices and/or an indication 610 being provided to the case 112 from a second one of the media output devices 150 to the case 112 to indicate the detection by one or both of the media output devices 150 of the additional user input. Responsive to receiving the indication 410 and/or the indication 610, the case 112 may provide the instruction 412 to both of the media output devices 150 in the case 112. The media output devices 150 may each perform the action 414 responsive to the instruction 412.

In each of the examples of FIGS. 4, 5, and 6, at least one media output device 150 is present in the case 112. However, in one or more use cases, the case 112 may perform its own user input detections when no media output devices 150 are present in the case.

Figure 7:
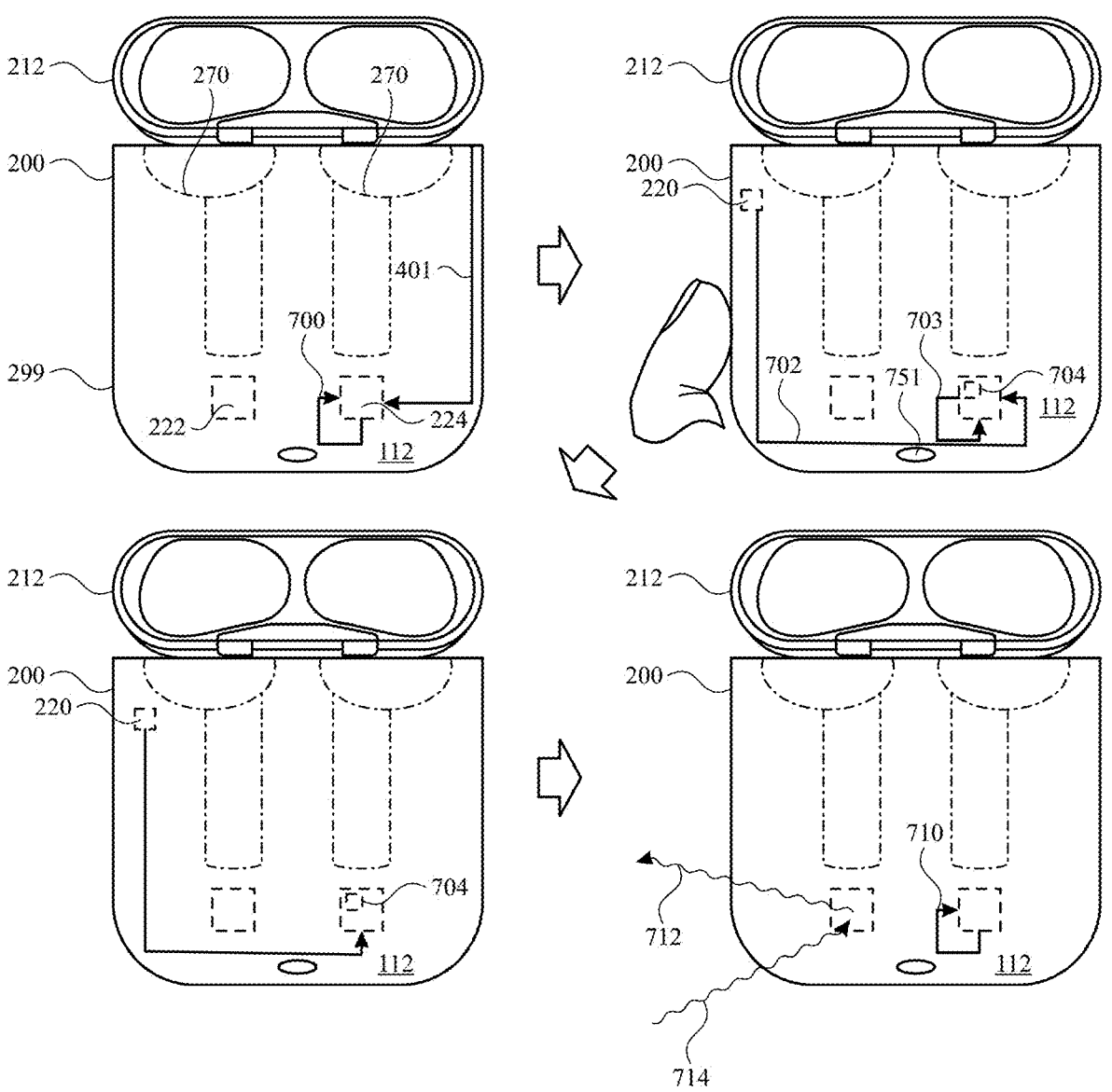
FIG. 7 illustrates a schematic diagram of an example operation for surface touch detection by a case in accordance with one or more implementations of the subject technology.

For example, as illustrated in FIG. 7, the case 112 (e.g., the processor 224) may determine (700) (e.g., responsive to a detection 401 that the lid 212 of the case 112 has been opened), that no media output devices 150 are present in the case 112 (e.g., in the cavities 270). As shown, responsive to the determination (700) that no media output devices 150 are present in the case 112, the case 112 (e.g., the processor 224) may obtain sensor data 702 from one or more sensors 220 (e.g., accelerometers, gyroscopes, and/or magnetometers) of the case 112.

For example, the sensor data 702 may be provided as an input to a machine learning model 704 at the case 112 (e.g., a machine learning model being executed by the processor 224). As indicated in FIG. 7, the case 112 may identify (703), based on an output from the machine learning model 704, a user input on an exterior surface (e.g., outer surface 299) of the case 112. In one or more implementations, the case 112 (e.g., the processor 224) may perform one or more predetermined actions 710 responsive to the identifying of the user input on the exterior surface of the case 112.

As shown, in one or more implementations, following a first detection of a user input on the exterior surface of the case 112, the case 112 may perform additional detection operations for a period of time after the first detection, in order to detect an additional user input on the exterior surface of the case 112. In one or more implementations, the case 112 may perform the one or more predetermined actions 710 responsive to the first and the second detected user inputs on the exterior of the case 112 (e.g., the second user input may be a confirmatory input for the predetermined action), or the case 112 may perform a different predetermined action if the second user input is detected on the exterior surface of the case 112 within the predetermined period of time.

As examples, the predetermined action 710 may include performing a factory reset operation for the case 112 or performing a locating operation, such as for locating one or both of the media output devices 150 that are not in the case 112. For example, the locating operation may include transmitting a signal 712 (e.g., a wireless signal) to the media output device(s) 150 and/or receiving a signal 714 (e.g., a wireless signal) from the media output device(s) 150, and determining a location of the electronic device relative to the case based on the signal 712 and/or the signal 714 (e.g., based on a strength of the signal 714, and/or based on location information included in the signal 714). For example, the signal 712 may be a request for the media output device(s) 150 to respond with a ranging signal and/or a signal containing location information that indicates the (e.g., relative or absolute) location of the media output device(s) 150. In one or more implementations, the action 710 may include providing an output (e.g., with the output component 251 and/or a speaker of the case) to guide a user of the case to the location of the media output device(s) 150.

FIG. 8 illustrates a flow diagram of an example process 800 for operating a case for an electronic device, in accordance with implementations of the subject technology. For explanatory purposes, the process 800 is primarily described herein with reference to the media output device 150 and case 112 of FIGS. 1-7. However, the process 800 is not limited to the media output device 150 and case 112 of FIGS. 1-7, and one or more blocks (or operations) of the process 800 may be performed by one or more other components of other suitable devices, including the electronic device 110, the electronic device 115, and/or the servers 120. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

As illustrated in FIG. 8, at block 802, processing circuitry (e.g., processor 224) of a case (e.g., case 112) having an internal cavity (e.g., cavity 270) for storing for an electronic device (e.g., an electronic device 204, such as a media output device 150) may determine that the electronic device is present in the case (e.g., within the internal cavity in the case). An outer surface (e.g., outer surface 299) of the case may be free of user input components (e.g., the case may not have any buttons, switches, touch sensors, or the like disposed on the outer surface thereof). In one or more implementations, the electronic device may be or include an audio output device (e.g., an earbud or a headphone, such as a wireless earbud or headphone), and the case may be configured to charge a battery (e.g., battery 208) of the audio output device when the audio output device is in the case. For example, the case may determine that the electronic device is present in the case responsive to a detection (e.g., detection 401), by the case, of an opening of a lid (e.g., lid 212) of the case.

At block 804, the case may provide a first instruction (e.g., instruction 402) to the electronic device (e.g., over a wired or wireless connection between the case and the electronic device) to perform one or more detection operations for detecting a user input to the case. For example, the user input to the case may be a touch input (e.g., a touch, tap, double tap, swipe, or other touch input) on the outer surface of the case. For example, the touch input may include one or more taps on the outer surface of the case. In other examples, the user input may be a shake or other movement of the case.

At block 806, the case may receive, from the electronic device, an indication (e.g., indication 406) of the user input to the case. For example, the electronic device that is disposed within the case may detect the user input based on one or more sensor signals (e.g., accelerometer signals, gyroscope signals, and/or other inertial sensor signals, such as sensor signal 495 and/or sensor signal 595) from one or more sensors (e.g., sensors 220, such as an accelerometer, a gyroscope, and/or other inertial sensor), and/or based on one or more microphone signals (e.g., audio signals 497 and/or audio signal 597) from one or more microphones (e.g., microphones 152, 152B) of the electronic device. In one or more implementations, the one or more sensor signals and/or the one or more microphone signals may be provided to a machine learning model (e.g., machine learning model 499) at the electronic device, the machine learning model having been trained to detect user inputs to an outer surface of the case based on one or more microphone signals and/or one or more sensor signals generated by microphones and/or sensors that are housed within a housing (e.g., housing 205) that is removable from the case.

In one or more implementations, a case that is free of buttons, switches, touch sensors, or the like disposed on the outer surface thereof may include, on the outer surface, one or more features, such as a contrastive texture or material, that may provide a passive haptic feedback that may indicate a particular location on the case at which a user can tap the case to provide an input, as described herein. For example, the one or more features may be provided at a location that has been determined to enhance the effect, on the sensors and/or microphones of the electronic device (e.g., the media output device 150), of a tap on the case 112.

At block 808, the case may provide a second instruction (e.g., instruction 409 or instruction 412) to the electronic device to perform an action (e.g., a pairing operation or other action) responsive to the detection of the user input. For example, the second instruction may include an instruction, to the electronic device from the case, to start a pairing operation after a predetermined amount of time. In one or more implementations, the case may also receive, from the electronic device, an additional indication (e.g., indication 410) of an additional user input to the case prior to passage of the predetermined amount of time, and may instruct (e.g., instruction 412) the electronic device to perform an updated action (e.g., action 414), different from the action (e.g., immediately or if a further additional user input, such as third user input) to the case is detected by the electronic device within an updated predetermined amount of time). For example, the updated action may include a factory reset of at least one of the case or the electronic device.

In one or more implementations, the case may include an accelerometer (e.g., sensor 220), and the process 800 may also include providing, by the case, accelerometer data from the accelerometer to the electronic device for use in the one or more detection operations (e.g., as discussed herein in connection with FIG. 4). For example, the indication (e.g., indication 406 or the indication 410) of the user input to the case may be based on the accelerometer data and additional accelerometer data obtained by an additional accelerometer (e.g., sensor 201) of the electronic device.

In one or more implementations, the case (e.g., processor 224) may determine that the electronic device and an other electronic device (e.g., another electronic device 204, such as another media output device 150) are present in the case, and may determine, prior to providing the first instruction to the electronic device, which of the electronic device and the other electronic device is to perform the one or more detection operations. In one or more implementations, the case may also provide, to the other electronic device, the first instruction (e.g., instruction 402) to perform the one or more detection operations in parallel with the one or more detection operations at the electronic device (e.g., as discussed herein in connection with FIG. 6).

FIG. 9 illustrates a flow diagram of an example process 900 for user input detection using an electronic device that is disposed within a case, in accordance with implementations of the subject technology. For explanatory purposes, the process 900 is primarily described herein with reference to the media output device 150 and the case 112 of FIGS. 1-7. However, the process 900 is not limited to the media output device 150 and case 112 of FIGS. 1-7, and one or more blocks (or operations) of the process 900 may be performed by one or more other components of other suitable devices, including the electronic device 110, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, sensor data (e.g., sensor data 495 and/or audio data 497) may be obtained from one or more sensors (e.g., sensor(s) 201 and/or microphone(s) 152) of an electronic device (e.g., electronic device 204, such as a media output device 150, such as an earbud) that is disposed within, and removable from, another electronic device (e.g., case 112 having processor 224 and communications circuitry 222). For example, obtaining the sensor data from the one or more sensors comprises obtaining the sensor data from at least an accelerometer (e.g., sensor 201) and a microphone (e.g., microphone 152).

At block 904, processing circuitry (e.g., processor 202) of the electronic device may determine whether the sensor data indicates a user input on an outer surface (e.g., outer surface 299) of the other electronic device. For example, determining whether the sensor data indicates the user input on the outer surface of the other electronic device may include providing the sensor data to a machine learning model (e.g., machine learning model 499) at the electronic device, and determining whether the sensor data indicates the user input on the outer surface of the other electronic device based on an output of the machine learning model. For example, the output of the machine learning model may be a binary signal indicating detection or no detection of the user input, or may be a more complex output, such as a classification of one or more user inputs (e.g., as taps, multi-taps, touches, shakes, swipes, etc.) and/or a confidence or probability of the detection of the one or more user inputs. In one or more implementations, obtaining the sensor data may include obtaining the sensor data responsive to an instruction (e.g., instruction 402) from the other electronic device.

In one or more implementations, the process 900 may also include providing, from the electronic device to the other electronic device within which the electronic device is disposed, an indication (e.g., indication 406) of the user input. In one or more implementations, the process 900 may also include receiving, by the electronic device from an additional electronic device (e.g., an additional electronic device 204, such as an additional media output device 150, such as a second earbud of a pair of earbuds) disposed within and removable from the other electronic device, additional sensor data (e.g., additional microphone data and/or additional accelerometer data from one or more microphones and/or accelerometers of the other electronic device), and determining, by the electronic device, whether the sensor data indicates the user input on the outer surface of the other electronic device based on the sensor data and the additional sensor data (e.g., by providing the additional sensor data to the machine learning model at the electronic device along with the sensor data obtained by the sensors and/or microphones of the electronic device).

FIG. 10 illustrates a flow diagram of an example process 1000 for user input detection by a case for an electronic device, in accordance with implementations of the subject technology. For explanatory purposes, the process 1000 is primarily described herein with reference to the case 112 of FIGS. 1-7. However, the process 1000 is not limited to the case 112 of FIGS. 1-7, and one or more blocks (or operations) of the process 1000 may be performed by one or more other components of other suitable devices, including the electronic device 110, the electronic device 115, and/or the servers 120. Further for explanatory purposes, some of the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

As illustrated in FIG. 10, at block 1002, a case (e.g., case 112) having an internal cavity (e.g., cavity 270) for storing for an electronic device (e.g., electronic device 204, such as a media output device 150, such as an earbud) may determine (700) that the electronic device is not present in the case.

At block 1004, the case may obtain, responsive to determining that the electronic device is not present in the case, sensor data (e.g., sensor data 702) from a sensor (e.g., sensor 220, such as an accelerometer) of the case. In one or more implementations, the case may be free of sensors other than the sensor, and free of any sensors or input components on an exterior surface (e.g., outer surface 299) of the case. In one or more implementations, obtaining the sensor data may include obtaining the sensor data responsive to an instruction (e.g., instruction 402) from the other electronic device.

At block 1006, the case (e.g., processor 224) may provide the sensor data as an input to a machine learning model (e.g., machine learning model 704) at the case. For example, the machine learning model may be executed by one or more processors (e.g., processor 224) of the case, and may have been trained to detect one or more user inputs based on sensor data corresponding to the sensor of the case.

At block 1008, the case (e.g., processor 224) may identify (703), based on an output from the machine learning model, a user input on an exterior surface (e.g., outer surface 299) of the case. For example, the output of the machine learning model may be a binary signal indicating detection or no detection of the user input (e.g., any user input or a particular user input for which the machine learning model has been trained), or may be a more complex output, such as a classification of one or more user inputs (e.g., as taps, multi-taps, touches, shakes, swipes, etc.) and/or a confidence or probability of the detection of the one or more user inputs.

In one or more implementations, a case that is free of sensors or input components on an exterior surface thereof may include, on the exterior surface, one or more features, such as a contrastive texture or material, that may provide a haptic feedback (e.g., indicating a particular location on the case at which a user can tap the case to provide an input as described herein). For example, the one or more features may be provided at a location that has been determined to enhance the effect of a tap on the sensor of the case.

At block 1010, the case may perform a predetermined action (e.g., action 710) responsive to the identifying of the user input on the exterior surface of the case. For example, the predetermined action may include a factory reset operation for the case. As another example, the predetermined action may include a locating operation for locating the electronic device. For example, the locating operation may include transmitting a signal 712 (e.g., a wireless signal) to the electronic device and/or receiving a signal 714 (e.g., a wireless signal) from the electronic device, and determining a location of the electronic device relative to the case based on the signal 712 and/or the signal 714.

Various examples are described herein in which the case 112 is free of any user input components (e.g., buttons, switches, touch sensors, etc.) on the outer surface of the case, and one or more accelerometers and/or one or more microphones of the media output device(s) 150 that are stored in the case (e.g., and/or one or more accelerometers of the case 112 itself) can be used to detect user inputs to the case. However, it is also appreciated that one or more accelerometers and/or one or more microphones of the media output device(s) 150 that are stored in the case (e.g., and/or one or more accelerometers of the case 112 itself) can be used to detect user inputs to the case even in implementations in which the outer surface of the case 112 does include user input components, such as touch sensors, buttons, or switches. In these other implementations, the determination of whether a touch input occurred may be performed independent of any input from the touch sensors, buttons, or switches (e.g., in a use case in which the touch sensors, buttons, or switch on the case are deactivated or disabled, or in a use case in which the case includes a touch sensor, button, and/or switch and the microphone(s) and/or accelerometer(s) provide functionality of another touch sensor, button, and/or switch that is not physically present on the case).

As described above, one aspect of the present technology is the gathering and use of data available from specific and legitimate sources for remote surface detection for electronic devices. The present disclosure contemplates that in some instances, this gathered data may include personal information data that uniquely identifies or can be used to identify a specific person. Such personal information data can include audio data, voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for remote surface detection for electronic devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of remote surface detection for electronic devices, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
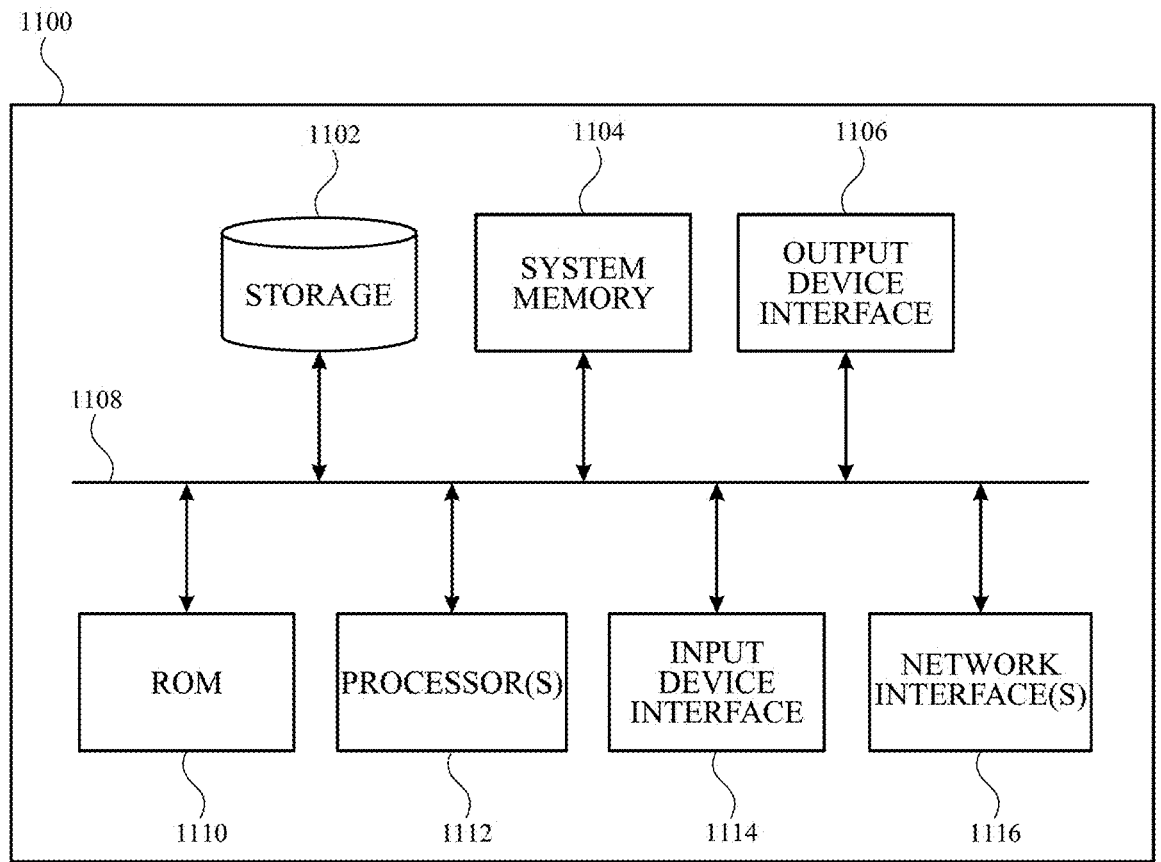
FIG. 11 illustrates an electronic system with which one or more implementations of the subject technology may be implemented.

FIG. 11 illustrates an electronic system 1100 with which one or more implementations of the subject technology may be implemented. The electronic system 1100 can be, and/or can be a part of, the media output device 150, the electronic device 104, the electronic device 110, the electronic device 115, and/or the server 120 as shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110 (which are each implemented as a non-transitory computer-readable medium). From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 110 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
   determining, by a case having an internal cavity for storing for an electronic device, that the electronic device is present in the case, wherein an outer surface of the case is free of user input components;
   providing, by the case, a first instruction to the electronic device to perform one or more detection operations for detecting a user input to the case;
   receiving, by the case from the electronic device, an indication of the user input to the case; and
   providing, by the case, a second instruction to the electronic device to perform an action responsive to the detection of the user input.

2. The method of claim 1, wherein the user input to the case is a touch input on the outer surface of the case.

3. The method of claim 2, wherein the touch input comprises one or more taps on the outer surface of the case.

4. The method of claim 1, wherein the electronic device comprises an audio output device, and wherein the case is configured to charge a battery of the audio output device when the audio output device is in the case.

5. The method of claim 1, wherein the case comprises an accelerometer, and wherein the method further comprises providing, by the case, accelerometer data from the accelerometer to the electronic device for use in the one or more detection operations, wherein the indication of the user input to the case is based on the accelerometer data and additional accelerometer data obtained by an additional accelerometer of the electronic device.

6. The method of claim 1, wherein the second instruction comprises an instruction, to the electronic device from the case, to start a pairing operation after a predetermined amount of time.

7. The method of claim 6, further comprising:
   receiving, by the case from the electronic device, an additional indication of an additional user input to the case prior to passage of the predetermined amount of time; and
   instructing the electronic device to perform an updated action, different from the action, if a further additional user input to the case is detected by the electronic device within an updated predetermined amount of time.

8. The method of claim 7, wherein the updated action comprises a factory reset of at least one of the case or the electronic device.

9. The method of claim 1, wherein the determining is performed responsive to a detection, by the case, of an opening of a lid of the case, and wherein the case is configured to provide a visual, audio, or haptic feedback responsive to the indication of the user input.

10. The method of claim 1, wherein the determining, by the case, comprises determining that the electronic device and an other electronic device are present in the case, and wherein the method further comprises determining, by the case and prior to providing the first instruction to the electronic device, which of the electronic device and the other electronic device is to perform the one or more detection operations.

11. The method of claim 10, further comprising providing, by the case to the other electronic device, the first instruction to perform the one or more detection operations in parallel with the one or more detection operations at the electronic device.

12. A non-transitory computer-readable storage medium storing instructions that, when executed by processing circuitry of an electronic device that is disposed within, and removable from, an other electronic device, cause the electronic device to perform operations comprising:
   obtaining sensor data from one or more sensors of the electronic device that is disposed within, and removable from, the other electronic device;
   receiving, from an additional electronic device disposed within and removable from the other electronic device, additional sensor data; and
   determining whether the sensor data indicates a user input on an outer surface of the other electronic device based on the sensor data and the additional sensor data.

13. The non-transitory computer-readable storage medium of claim 12, wherein the operations further comprise providing, from the electronic device to the other electronic device within which the electronic device is disposed, an indication of the user input.

14. The non-transitory computer-readable storage medium of claim 12, wherein obtaining the sensor data from the one or more sensors comprises obtaining the sensor data from at least an accelerometer and a microphone.

15. The non-transitory computer-readable storage medium of claim 14, wherein determining whether the sensor data indicates the user input on the outer surface of the other electronic device comprises:
   providing the sensor data to a machine learning model at the electronic device; and
   determining whether the sensor data indicates the user input on the outer surface of the other electronic device based on an output of the machine learning model.

16. The non-transitory computer-readable storage medium of claim 12, wherein obtaining the sensor data comprises obtaining the sensor data responsive to an instruction from the other electronic device, wherein the electronic device comprises an audio output device, and wherein the other electronic device comprises a case for the electronic device.

17. The non-transitory computer-readable storage medium of claim 12, wherein an outer surface of the other electronic device is free of user input components.

18. A case, comprising:
   an internal cavity for storing an electronic device; a sensor; and
   processing circuitry configured to:
      determine that the electronic device is not present in the case;
      obtain, responsive to determining that the electronic device is not present in the case, sensor data from the sensor of the case;
      provide the sensor data as an input to a machine learning model at the case;
      identify, based on an output from the machine learning model, a user input on an exterior surface of the case; and
      perform a predetermined action responsive to identification of the user input on the exterior surface of the case.

19. The case of claim 18, wherein the predetermined action comprises a factory reset operation for the case.

20. The case of claim 18, wherein the predetermined action comprises a locating operation for locating the electronic device.

21. The case of claim 18, wherein an outer surface of the case is free of user input components.

\*    \*    \*    \*    \*